US007391337B2

(12) United States Patent
St-Germain

(10) Patent No.: US 7,391,337 B2
(45) Date of Patent: Jun. 24, 2008

(54) INTERACTIVE LED DISPLAY NETWORK FOR RETAIL ENVIRONMENT

(75) Inventor: Nicolas St-Germain, Saint-Bruno (CA)

(73) Assignee: GELcore LLC, Valley View, OH (US)

( * ) Notice: Subject to any disclaimer, the term of this patent is extended or adjusted under 35 U.S.C. 154(b) by 269 days.

(21) Appl. No.: 11/234,582

(22) Filed: Sep. 23, 2005

(65) Prior Publication Data

US 2007/0069908 A1 Mar. 29, 2007

(51) Int. Cl.

*G05B 23/02* (2006.01)
*G08B 5/00* (2006.01)
*F21V 33/00* (2006.01)
*F21V 7/04* (2006.01)
*H05B 37/00* (2006.01)

(52) U.S. Cl. ....................... 340/686.1; 340/3.1; 340/3.5; 340/815.4; 340/825.22; 362/84; 362/85; 362/92; 362/125; 362/611; 362/614; 315/307; 315/312; 315/318; 315/291; 315/292

(58) Field of Classification Search ............. 340/815.4, 340/815.45, 686.1, 825.22, 3.1, 3.5; 362/611–614, 362/84–85, 92, 125; 315/291–292, 307, 315/312, 318

See application file for complete search history.

(56) References Cited

U.S. PATENT DOCUMENTS

| | | | | |
|---|---|---|---|---|
| 5,128,855 | A | 7/1992 | Hilber et al. | |
| 5,205,638 | A * | 4/1993 | Squitieri | 362/125 |
| 5,305,197 | A * | 4/1994 | Axler et al. | 705/14 |
| 5,508,898 | A * | 4/1996 | McGovern | 362/92 |
| 5,576,527 | A * | 11/1996 | Sawanobori | 235/455 |
| 6,016,038 | A | 1/2000 | Mueller et al. | |
| 6,150,774 | A | 11/2000 | Mueller et al. | |
| 6,166,496 | A * | 12/2000 | Lys et al. | 315/316 |
| 6,170,273 | B1 | 1/2001 | Bosi | |
| 6,179,434 | B1 * | 1/2001 | Saraiji | 362/125 |
| 6,211,626 | B1 | 4/2001 | Lys et al. | |
| 6,292,901 | B1 | 9/2001 | Lys et al. | |
| 6,340,868 | B1 | 1/2002 | Lys et al. | |
| 6,361,198 | B1 | 3/2002 | Reed | |
| D457,667 | S | 5/2002 | Piepgras et al. | |
| D457,669 | S | 5/2002 | Piepgras et al. | |

(Continued)

FOREIGN PATENT DOCUMENTS

| | | |
|---|---|---|
| GB | 2 408 315 | 5/2005 |

(Continued)

OTHER PUBLICATIONS

International Search Report corresponding to PCT/US2006/037011.

(Continued)

*Primary Examiner*—Benjamin C. Lee
*Assistant Examiner*—Lam Pham
(74) *Attorney, Agent, or Firm*—Fay Sharpe LLP

(57) ABSTRACT

A bi-directional communication system communicates between a control station, which receives and outputs control signals, and one or more display cabinets. LEDs illuminate objects disposed about the cabinets. Addressable nodes interactively communicate with the control station and selectively operate the LEDs, each node being coupled to the control station and to associated LEDs.

17 Claims, 2 Drawing Sheets

U.S. PATENT DOCUMENTS

| | | | | |
|---|---|---|---|---|
| D457,974 | S | 5/2002 | Piepgras et al. | |
| D458,395 | S | 6/2002 | Piepgras et al. | |
| D463,610 | S | 9/2002 | Piepgras et al. | |
| 6,459,919 | B1 | 10/2002 | Lys et al. | |
| D648,035 | | 12/2002 | Blanc et al. | |
| 6,528,954 | B1 | 3/2003 | Lys et al. | |
| 6,548,967 | B1 * | 4/2003 | Dowling et al. | 315/318 |
| 6,558,017 | B1 * | 5/2003 | Saraiji et al. | 362/125 |
| 6,577,080 | B2 | 6/2003 | Lys et al. | |
| 6,608,453 | B2 | 8/2003 | Morgan et al. | |
| 6,624,597 | B2 | 9/2003 | Dowling et al. | |
| 6,827,463 | B2 * | 12/2004 | Chuang et al. | 362/92 |
| 6,982,649 | B2 * | 1/2006 | Blum et al. | 340/815.4 |
| 7,036,947 | B2 * | 5/2006 | Chuang et al. | 362/92 |
| 7,165,857 | B2 * | 1/2007 | Fong | 362/35 |
| 2002/0047628 | A1 | 4/2002 | Morgan et al. | |
| 2002/0145394 | A1 * | 10/2002 | Morgan et al. | 315/291 |
| 2006/0039149 | A1 * | 2/2006 | Jamnia et al. | 362/257 |

FOREIGN PATENT DOCUMENTS

| | | |
|---|---|---|
| WO | WO 02/098182 | 12/2002 |
| WO | WO 03/055273 | 7/2003 |

OTHER PUBLICATIONS

International Search Report dated May 15, 2007 from corresponding PCT patent application PCT/US2006/037011.

* cited by examiner

INTERACTIVE LED DISPLAY NETWORK FOR RETAIL ENVIRONMENT

BACKGROUND

The present application relates to the LED lighting systems. It finds particular application in conjunction with a display illumination within refrigeration cabinets, and will be described with particular reference thereto. However, it is to be appreciated that the present application is also amenable to other retail environments.

Typically, products in the retail environment are contained in the cabinets, which are often refrigerated. A cabinet typically has a form of a chest defining an environment intended to contain the products and having an access such that the products can be easily removed either directly by a customer or by a sales representative. Such cabinets are widely used for the distribution of products in supermarkets and other points of distribution or sale, such as cafés and other retail establishments. Historically, the essential functional requirement of such cabinets has been the containment of the products and a maintenance of environmental conditions within the cabinets, e.g., temperature and humidity.

Recently, a great deal of attention has been given to the aesthetics of the design to give the cabinet a more attractive and pleasant appearance, which would encourage interaction with the customer and make it generally more appealing and more likely to promote the purchase of the products. The systems and methods have been proposed, in which traditional lights or LEDs are controlled by a processor to alter the brightness and/or color of the generated light to provide predetermined patterns of light. One drawback of such computer-controlled LED lighting systems is that an operator or user is required to interactively control it.

The present application provides a new interactive display system for retail environments.

BRIEF DESCRIPTION

In accordance with one aspect of the present application, a bi-directional communication system for communicating between a control station, which receives and outputs control signals, and one or more display cabinets is disclosed. LEDs illuminate objects disposed about the cabinets. Addressable nodes interactively communicate with the control station and selectively operate the LEDs, each node being coupled to the control station and to associated LEDs.

In accordance with another aspect of the present application, method for bi-directionally controlling a light show is disclosed. An input signal of a sensor is received at a control station coupled to a network, the sensor being disposed about a display cabinet. In response to receiving the sensor signal, an output signal sequence is generated to produce a predetermined light show effect. Activation states of associated LEDs disposed about the display cabinet are selectively changed based on the generated output signal sequence via associated nodes.

One advantage of the present application resides in the display system bi-directionality.

Another advantage resides in a fast and effective change of display.

Still further advantages and benefits of the present application will become apparent to those of ordinary skill in the art upon reading and understanding the following detailed description of the preferred embodiments.

BRIEF DESCRIPTION OF THE DRAWINGS

The application may take form in various components and arrangements of components, and in various process operations and arrangements of process operations. The drawings are only for the purpose of illustrating preferred embodiments and are not to be construed as limiting the application.

DETAILED DESCRIPTION

Figure 1:
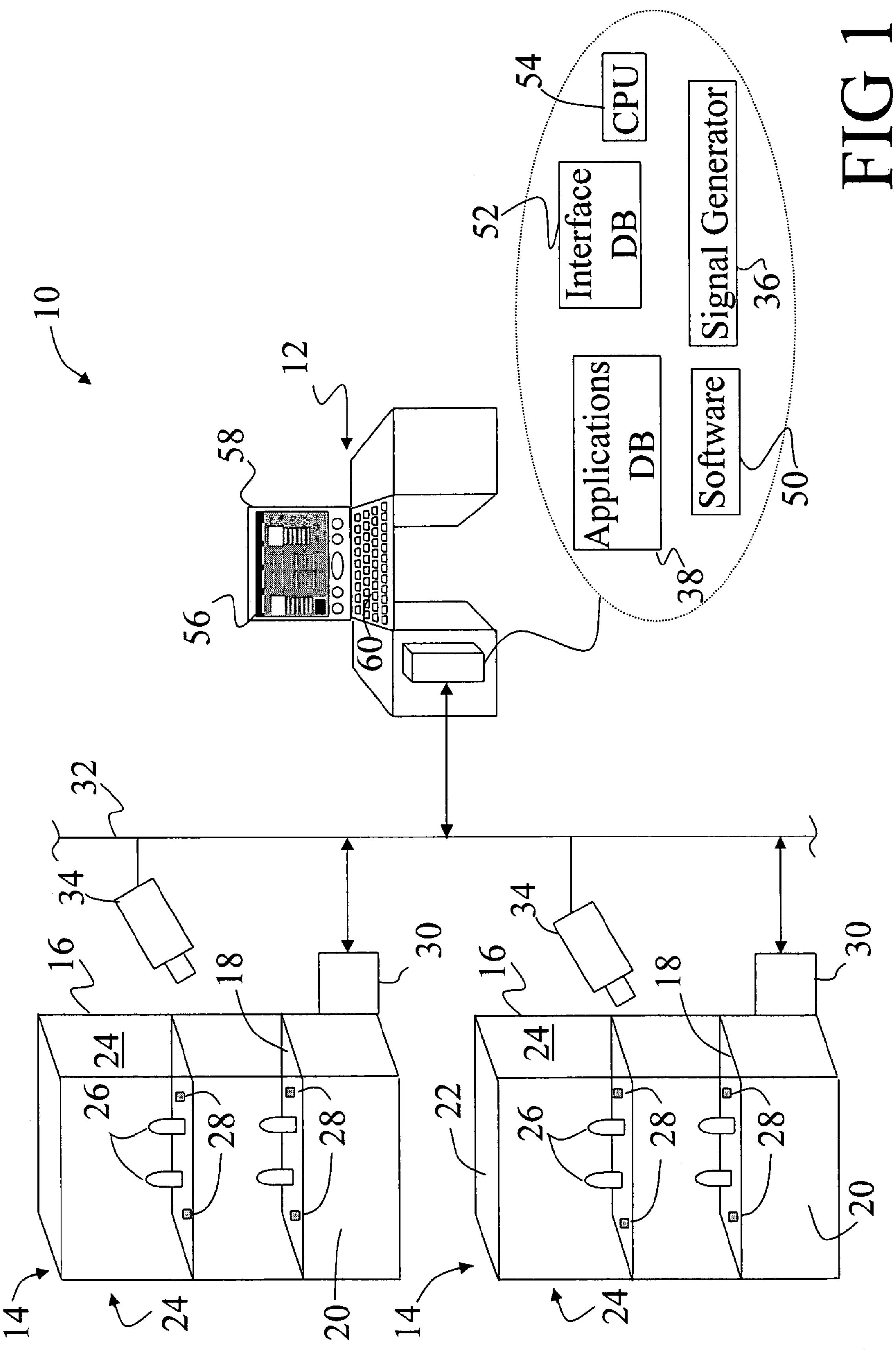
FIG. 1 is a diagrammatic illustration of the two-directional communication system.

With reference to FIG. 1, a bi-directional communication system 10 is established between a control or computer station 12 and one or more display cabinets 14. The display cabinets 14 each typically includes a case 16 and at least one shelf 18. In one embodiment, a door (not shown) is mounted to a front 20 of the case 16. Optionally, the door can be mounted to a top 22 or a side 24. The door includes glass panel, through which the customer can observe objects 26 which are positioned on the shelf 18. Of course, it is also contemplated that the cabinet might not have the door. In this case, the glass panel can be mounted to one of the sides 24. LEDs 28 are disposed in the vicinity of the case 16. The LEDs 28 are arranged or configured in a specific manner. For example, the LEDs 28 are arranged to form a variable message, provide illumination of the objects 26, provide special effects using red, green, blue, white LEDs, or monochromatic LEDs, and other displays. The LEDs 28 can be mounted to the shelf 18, to the glass panel door (not shown), or any other suitable place for mounting the LEDs 28. If the LEDs 28 are arranged to illuminate the objects 26, in one embodiment, a reflector is positioned to direct the light emitted from the LEDs 28 toward the objects 26. The reflector can comprise metal, plastic, plastic covered with a film, and transparent plastic using the method of total internal reflection to direct light to conventional reflector as well as other conventional materials. The surfaces inside the case 16 can be polished to further increase the efficacy.

The control station 12 interactively communicates with a plurality of nodes 30, which are electrically or otherwise connected with the control station 12 and the LEDs 28. In one embodiment, the nodes 30 and the control station 12 are coupled to a network 32. Each node 30 includes a sensor or sensors 34, which detect a change in the environment near an associated display cabinet 14, such as a passage of a person, a temperature within the case 16, a case door opening, a customer standing in front of the display cabinet 14, and other like events, and provides a corresponding input signal to the control station 12. Optionally, the computer station 12 collects the information of customers' consumption habits, e.g., which display cabinets 14 have been visited the most frequently, and stores the information as a look up table which identifies the location, the frequency of visits, and other appropriate information. The selected collected information might be printed on paper, stored in a non-volatile electronic or magnetic storage medium, transmitted over a local area network or the Internet, or otherwise processed. The examples of the sensor 34 are a proximity sensor, a motion detector, a temperature sensor, a humidity sensor, a digital camera, and any other appropriate sensor. In response to receiving the input control signal from the sensor 34, the control station 12 sends back appropriate control output signals to the corresponding nodes 30. More specifically, an applications database 38 includes a set of predetermined instructions or LEDs' activation state sequences which are configured by a user in advance to generate predetermined visual displays at the display cabinets 14. Upon receiving the information from the sensors 34, a signal generator 36 consults the applications database 38 and generates corresponding output signals which are indicative of a desired activation state sequence for the associated LEDs 28. E.g., a special lighting or special effects are generated by using dimming, flashing, variable messaging, selective displaying of red, green and blue colors, and other effects.

Figure 2:
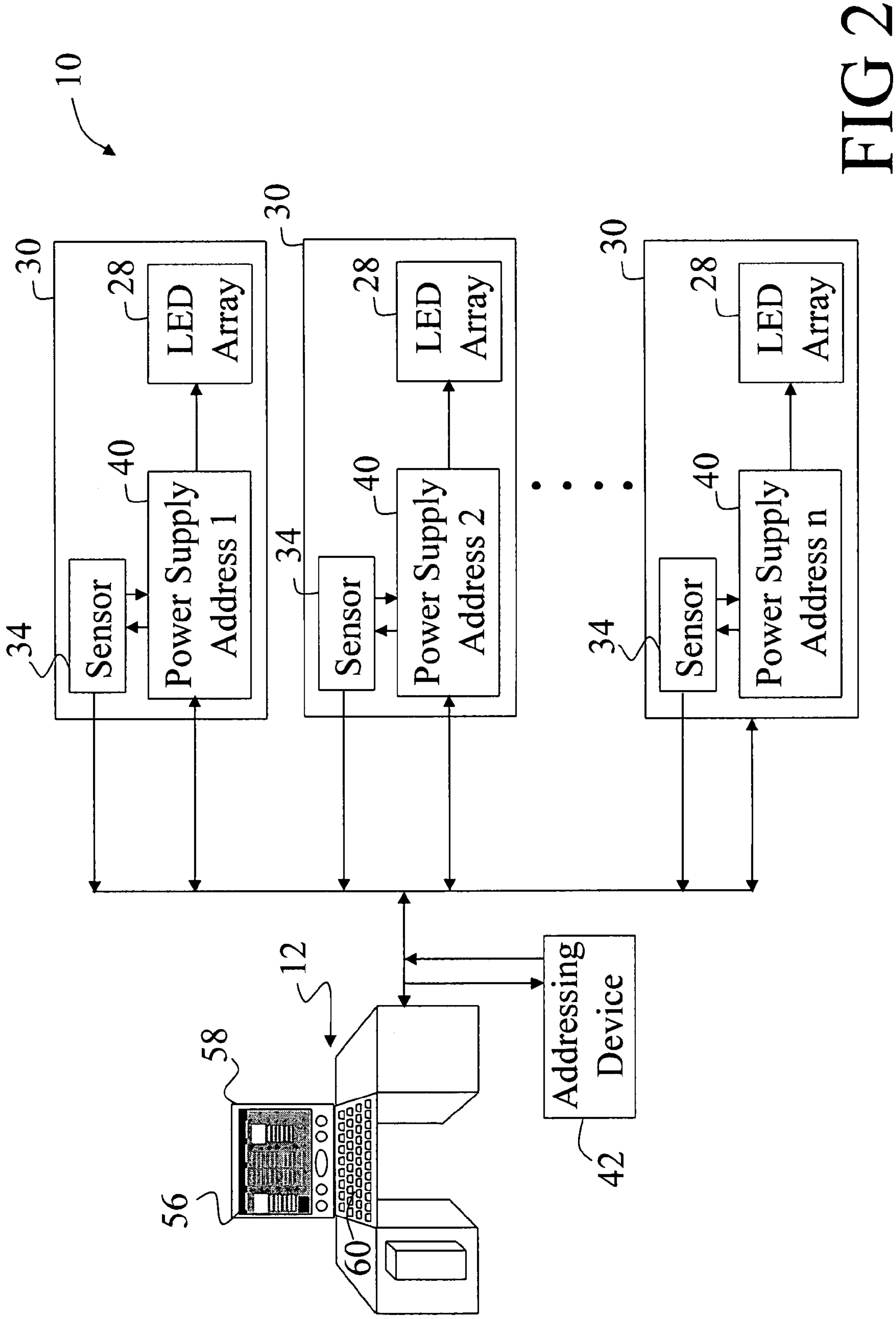
FIG. 2 is a diagrammatic illustration of a portion of the two-directional communication system.

With continuing reference to FIG. 1 and further reference to FIG. 2, each node 30 includes an addressable power supply 40, which is addressed by an addressing device 42 such that only the selected nodes 30 receive the output control signals from the signal generator 36. Such addressable power supplies are known in the art and are available, for example, from ZigBee, DALI, DMX, and other suppliers. Each addressed power supply 40 directly controls each LED 28 by changing the LED's activation state such as turning the LED ON, OFF, dimming, flashing, etc. For example, the power supply 40 is controlled such that some objects 26 stored in the cases 16 are lit differently than other objects 26 (i.e., different colors, different brightness, flashing) to differentiate the objects 26 stored in the cases 16. Optionally, the power supply 40 is controlled to illuminate the objects 26 only when the sensor 34 detects a passerby, which leads to substantial energy savings. The power supply can be controlled to generate messages to attract customers in "standby" conditions. In one embodiment, the power supply 40 includes on-board electronics to transmit data from the sensors 34 and receive data from the signal generator 36.

With continuing reference to FIG. 1, the control station 12, for example, is preferably a personal computer, a workstation, a laptop computer, or the like, and includes any appropriate software and hardware to manage the bi-directional communications with the nodes 30 including a software technique or process 50, an interface database 52, and a CPU 54. The operator uses interface screens 56 displayed on a monitor 58 to enter or change instructions in the applications database 38 by a use of a keyboard, mouse, touch screen, or any other appropriate operator interface input means 60.

The application has been described with reference to the preferred embodiments. Obviously, modifications and alterations will occur to others upon reading and understanding the preceding detailed description. It is intended that the application be construed as including all such modifications and alterations insofar as they come within the scope of the appended claims or the equivalents thereof.

The invention claimed is:

1. A bi-directional communication system for communicating between a control station, which receives and outputs control signals, and one or more display cabinets, the system comprising:

LEDs for illuminating objects disposed about the cabinets;

addressable nodes for interactively communicating with the control station and selectively operating the LEDs, each node being coupled to the control station and associated LEDs; and a signal generator at the control station for receiving information from each addressable node and generating corresponding output signals which are indicative of a desired activation state sequence for the associated LEDs;

wherein each node includes:

a sensor for detecting a change in an environment and sending a corresponding input signal to the control station, the sensor being disposed about the cabinet; and an addressable power supply which selectively changes an activation state of selected associated LEDs in response to being addressed by the control station, which activation state change is based on the received sensor input signal and predetermined LEDs' activation state sequence.

2. The system according to claim 1, further including:

an applications database for storing a set of predetermined LEDs' activation state sequences, which database is configurable by a user to generate predetermined visual displays.

3. The system according to claim 1, wherein the change in the LEDs' activation state includes one of turning OFF selected LEDs and turning ON selected LEDs for displaying a predetermined message.

4. The system according to claim 1, wherein the change in the LEDs' activation state includes one of dimming, flashing, variable messaging, and selective displaying of red, green and blue colors for generating the predetermined visual displays.

5. The system according to claim 1, wherein the sensor includes at least one of:

a motion sensor, a humidity sensor, a proximity sensor, a temperature sensor, and a digital camera.

6. An LED display system for illuminating objects disposed in cabinets, the LED display system being coupled to a network, the LED display system comprising:

a control station for controlling the LED display system, the control station being coupled to the display system and the network and including:

a signal generator for interactively communicating with the display system by receiving input signals from the display system and generating output signals in response to the received input signals, which are indicative of a desired activation state sequence for the associated LEDs, a display unit, an applications database for storing a set of predetermined instructions for controlling the LEDs activation state sequence, which is configurable by a user, and an interface database for displaying interactive user interface screens on the display unit, the user interface screens allowing the user to configure the applications database;

for producing light output, the LEDs being disposed about the cabinet; and at least one node for interactively communicating with the control station and selectively operating the LEDs in response to receiving the output signals from the signal generator, the node being coupled to the network and to the LEDs.

7. The system according to claim 6, wherein the node includes:

a sensor for detecting a change in an environment and sending the input signals to the signal generator, the sensor being disposed about the cabinet.

8. The system according to claim 7, wherein the applications database stores at least a set of predetermined instructions, and wherein, in response to receiving the input signals, the signal generator generates the output signals in accordance with the received input signals and predetermined instructions.

9. The system according to claim 8, wherein the node further includes:

a power supply for controlling an activation state of the at least one LED in response to the output signals received from the signal generator, the power supply being coupled to the at least one LED and the control station.

10. The system according to claim 7, wherein the sensor includes at least one of:

a motion sensor, a humidity sensor, a proximity sensor, a temperature sensor, and a digital camera.

11. The system according to claim 6, further including:

a plurality of nodes, each node (30) being coupled to the network and including:

a plurality of LEDs being coupled to an associated node, an addressable power supply coupled to the associated LEDs, and a sensor for detecting a change in an environment and sending the input signals to the control station, in response to which the signal generator sends to a selected node the output signals, the sensor being disposed about the cabinet;

wherein, in response to the received output signals, the power supply of the selected node selectively changes the activation state of the associated LEDs to selectively configure the associated LEDs into any of a plurality of physical and electrical configurations.

12. The system according to claim 11, wherein the plurality of physical and electrical configurations is achieved by one of:

dimming;

flashing;

variable messaging; and selective displaying of one of red, green and blue colors.

13. A method for bi-directionally controlling a light show, comprising:

receiving an input signal of a sensor at a control station coupled to a network, the sensor being disposed about a display cabinet;

in response to receiving the sensor signal, generating an output signal sequence to produce a predetermined light show effect; and selectively changing activation states of associated LEDs disposed about the display cabinet based on the generated output signal sequence via associated nodes, wherein each node includes an addressable cower supply and further includes:

selectively addressing one or more cower supplies, each cower supply being coupled to the network and to the associated LEDs;

sending the generated output signal sequence to each addressed power supply; and controlling the LEDs' activation state with the associated addressed power supply based on the received output signal sequence.

14. The method according to claim 13, further including:

storing a set of predetermined LEDs' activation states sequences in a database, which database is configurable by a user to generate the predetermined light show.

15. The method according to claim 13, wherein the step of changing activation states of the associated LEDs includes:

turning OFF and turning ON selected LEDs; and displaying a predetermined message.

16. The method according to claim 13, wherein the step of changing activation states of the associated LEDs includes:

one of dimming, flashing, variable messaging, and selective displaying of red, green and blue colors; and generating predetermined light show effects.

17. The method according to claim 13, wherein the sensor includes at least one of:

a motion sensor, a humidity sensor, a proximity sensor, a temperature sensor, and a digital camera.

* * * * *